United States Patent
Papierniak et al.

(10) Patent No.: US 6,934,687 B1
(45) Date of Patent: *Aug. 23, 2005

(54) COMPUTER ARCHITECTURE AND METHOD FOR SUPPORTING AND ANALYZING ELECTRONIC COMMERCE OVER THE WORLD WIDE WEB FOR COMMERCE SERVICE PROVIDERS AND/ OR INTERNET SERVICE PROVIDERS

(75) Inventors: Karen A. Papierniak, St. Paul, MN (US); James E. Thaisz, Lincroft, NJ (US); Luo-Jen Chiang, Freehold, NJ (US); Susan L. Woodford, Bedminster, NJ (US); Eugene M. Betz, Toms River, NJ (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 982 days.

(21) Appl. No.: 08/975,428

(22) Filed: Nov. 20, 1997

(51) Int. Cl.[7] .......................... G06F 17/60; G06F 17/00
(52) U.S. Cl. ................... 705/10; 705/1; 705/7
(58) Field of Search ................... 705/1, 7, 10; 709/224

(56) References Cited

U.S. PATENT DOCUMENTS

| | | | | |
|---|---|---|---|---|
| 4,851,999 A | * | 7/1989 | Moriyama | 705/30 |
| 4,972,504 A | * | 11/1990 | Daniel, Jr. et al. | 705/10 |
| 5,233,513 A | * | 8/1993 | Doyle | 705/7 |
| 5,245,533 A | * | 9/1993 | Marshall | 705/10 |
| 5,359,508 A | * | 10/1994 | Rossides | 705/30 |
| 5,513,356 A | * | 4/1996 | Takahashi et al. | 395/710 |
| 5,526,257 A | * | 6/1996 | Lerner | 705/10 |
| 5,583,763 A | * | 12/1996 | Atcheson et al. | 707/3 |

(Continued)

OTHER PUBLICATIONS

Buckman, John, "Data Mining for the Soft Assets", Investor Relations, Dec. 1, 1996, 2 pgs.*
Brio Technology, "Brio Technology, On European Business Expansuin Quest, Deliver New Query and Analysis Tool", IAC Newsletter (Feb. 22, 1996), 1 pg.*

(Continued)

*Primary Examiner*—James W. Myhre
(74) *Attorney, Agent, or Firm*—Lowe Hauptman Gilman & Berner, LLP

(57) ABSTRACT

A computer system that supports and analyzes Internet and/or electronic commerce data includes at least one user station transmitting a user request, and at least one Internet server, connectable to the user station, and providing the user station access to external data sources. The computer system also includes at least one data collection and analysis system. The data collection and analysis system includes at least one analysis module performing statistical and analytical analysis of the Internet and/or electronic commerce data for use by a user in performing one or more business decisions, and at least one Internet and/or electronic commerce data warehouse which is responsively connected to the analysis module and separated from external systems. The data warehouse receives the Internet and/or electronic commerce data, and provides access to the Internet and/or electronic commerce data by the user. The data collection and analysis system also includes at least one data mapping module which searches, collects and transforms the Internet and/or electronic commerce data, and transmits the same to the data warehouse for storage.

30 Claims, 12 Drawing Sheets

U.S. PATENT DOCUMENTS

| | | | | |
|---|---|---|---|---|
| 5,590,325 A | * | 12/1996 | Kolton et al. | 707/104 |
| 5,615,341 A | * | 3/1997 | Agrawal et al. | 705/10 |
| 5,636,346 A | * | 6/1997 | Saxe | 705/1 |
| 5,696,965 A | * | 12/1997 | Dedrick | 707/10 |
| 5,710,886 A | * | 1/1998 | Christensen et al. | 705/14 |
| 5,715,450 A | * | 2/1998 | Ambrose et al. | 707/103 |
| 5,732,397 A | * | 3/1998 | DeTore et al. | 705/1 |
| 5,774,868 A | * | 6/1998 | Cragun et al. | 705/10 |
| 5,848,396 A | * | 12/1998 | Gerace | 705/10 |
| 5,892,917 A | * | 4/1999 | Myerson | 709/224 |
| 5,924,080 A | * | 7/1999 | Johnson | 705/26 |
| 5,937,390 A | * | 8/1999 | Hyodo | 705/14 |
| 5,963,914 A | * | 10/1999 | Skinner et al. | 705/11 |

OTHER PUBLICATIONS

Streams, "Streams Readies Release of Breakthrough Internet Media Planning and Assessment", Streams Online Media Development Corporation, retrieved from webpage http://streams.com/press_release.html, Aug. 31, 1995.*

Mogul, Jeffery, "Simple Hit–Metering for HTTP", Preliminary Draft, retrieved from website http://www.ics.uci.edu/pub/ietf/http/draft–ietf–http–hit–metering–00.txt, 30 pgs, Jan. 27, 1997.*

Tassone, Dominic, "The Lilypad White Paper", retrieved from website http://www.lilypad.net/paper.html, Feb. 1, 1997.*

Connolly, Daniel W., "Proposals for Gathering Consumer Demographics", retrieved from website http://www.w3.org/pub/WWW/Demographics/Proposals.htm, 6 pgs, Nov. 6, 1995.*

Microsoft Computer Dictionary, Third Edition, 1997, Microsoft Press, pp 133.*

About, "Data Warehouse", 2002, wysiwyg://34/http://databases.about...tuffworks_SKD&terms=data+warehouse, 2 pgs.*

SearchDatabase, "Data Warehouse", Jan. 3, 2002, wysiwyg://27/http://searchDatabase...inition/0,,sid13_gci211904,00.html, 1 pg.*

Atomica–Netscape, "data warehouse", 2001, Computer Desktop Encyclopedia, 1 pg.*

Korth, Henry F. and Silbershatz, Abraham, "Database System Concepts, Second Edition", McGraw–Hill, Inc., pp 12–20, 232, 233, 240, and 245–247, Jan. 1991.*

* cited by examiner

WEB USERS
(ESTIMATED GROWTH IN MILLIONS)

FIG. 12

| | |
|---|---|
| Hardware Options (minimum) | WM UNIX Platform - 2 Pentiums 166MHz CPUs, 128MB of base memory plus 32MB per user up to 5 users.<br>WM NT Server Platform - 2 Pentiums 166MHz CPUs, 128MB base memory plus 32MB per user up to 5 users.<br>Browser, DSS, Data Mining Client Platform - Any PC, Laptop, Server connected to the WM UNIX or NT server. Data Mining client hardware must have 1024x768 256 color graphics capability. |
| Software Base Options (minimum) | UNIX Server - UNIX SVR4 MP-RAS v3.0 or greater.<br>NT Server - Microsoft NT v4.0.<br>Browser, DSS and Data Mining Client - Windows 95, NT v4.0, Netscape 3.0 or Internet Explorer 3.0, ODBC, and Xvision. |
| Database Software Options (minimum) | Teradata V2 R1.1.1 or greater for NCR UNIX SVR4 MP-RAS<br>Oracle for Microsoft NT<br>Microsoft SQL Server on Microsoft NT |
| Database Connectivity Software (minimum) | Teradata CLI R4.0 for NCR UNIX SVR5 MP-RAS<br>Teradata ODBC R2.02 for Microsoft NT<br>ODBC included in Oracle for NT<br>ODBC included in MS SQL Server<br>Both 16 and 32 bit ODBC drivers for Windows 95 and NT 4.0 clients |
| Information Access or Decision Support and Data Mining Software | Info Access/DSS - Platinum Technology, Inc. InfoBeacon, MicroStrategy DSS Agent, Server, Web; Information Advantage Inc. Decision Suite<br>Data Mining - Angoss Software International KnowledgeSEEKER, NCR Knowledge Discovery Workbench, SABRE Decision Technologies Datawise |
| WebMining Tools | Examples of Data Source descriptions, business rules, and reports, Logical Data Models Utilities for Extraction Utilities and Data Transformation Base Structures and schema for each DB supported. |

COMPUTER ARCHITECTURE AND METHOD FOR SUPPORTING AND ANALYZING ELECTRONIC COMMERCE OVER THE WORLD WIDE WEB FOR COMMERCE SERVICE PROVIDERS AND/OR INTERNET SERVICE PROVIDERS

BACKGROUND OF THE INVENTION

1. Field of the Invention

The present invention is generally related to a computer architecture and method for supporting and analyzing Internet and/or electronic commerce over or from the World Wide Web for commerce service providers (CSPs) and/or Internet service providers (ISPs), and more particularly, to a computer architecture and method for supporting and analyzing Internet and/or electronic commerce over or from the World Wide Web for CSPs/ISPs by correlating user, application, and access functions.

2. Background of the Related Art

More and more people are using the Internet as a method of communicating, advertising and shopping for and purchasing goods. The sale of Internet services is growing at an amazing rate. The number of projected users into the year 2000 is dramatically impacting the communications industry both from the standpoint of an opportunity to realize new business and as a concern due to the potential loss of traditional revenue sources. FIG. 1 illustrates this dramatic increase sales in World Wide Web (WWW or web) servers, a summary of which is presented below:

| WORLD WIDE WEB SERVER SALES FORECAST | | | | | |
|---|---|---|---|---|---|
| | 1995 | 1996 | 1997 | 1998 | 1999 |
| Intranet | 475 | 2,673 | 5,483 | 9,210 | 13,133 |
| Internet | 621 | 979 | 1,410 | 1,777 | 2,159 |
| Total | 1,096 | 3,552 | 6,893 | 10,987 | 15,292 |

The explosive growth in PCs, Servers and Internet related software has cultivated a need for companies to better understand their customer's needs. To better understand these needs, many gigabytes of data must be collected and analyzed to arrive at the best way to service the customer.

Market and industry analysts alike, believe that the Internet will prove to be the most significant innovation in modern history since the light bulb and automobile. The method in which we perform daily business operations will be changed forever due to this new technology. Many technology based companies in the computer industry are scrambling to outline new products and services using and exploiting the Internet as a vehicle to increase market share and revenue, while increasing productivity and cutting operational costs. FIG. 2 is an illustration of the estimated growth in web users over the next several years.

In an effort to meet the above needs of digesting the vast amounts of information on the web, companies have designed many browsers and millions of web pages to access, retrieve and utilize this information. In addition to the Internet, companies have set up local "intranets" for storing and accessing data for running their organizations. However, the sheer amount of available information is posing increasingly more difficult challenges to conventional approaches.

A major difficulty to overcome is that information contained on the web or web pages are often dispersed across the network at many sites. It is often time-consuming for a user to visit all these sites. One conventional approach used to access this information more effectively is called a search engine. A search engine is actually a set of programs accessible at a network site within a network, for example a local area network (LAN) at a company or the Internet and World Wide Web. One program, called a "robot" or "spider," pre-traverses a network in search of documents and builds large index files of keywords found in the documents.

A user of the search engine formulates a query comprising one or more keywords and submits the query to another program of the search engine. In response, the search engine inspects its own index files and displays a list of documents that match the search query, typically as hyperlinks. When a user activates one of the hyperlinks to see the information contained in the document, the user exits the site of the search engine and terminates the search process.

Search engines, however, have their drawbacks. For example, a search engine is oriented to discovering textual information only. In particular, they are not well-suited to indexing information contained in structured databases, e.g. relational databases, voice related information, audio related information, and the like. Moreover, mixing data from incompatible data sources is difficult in conventional search engines.

Another disadvantage with conventional search engines is that irrelevant information is aggregated with relevant information. For example, it is not uncommon for a search engine on the web to locate hundreds of thousands of documents in response to a single query. Many of those documents are found because they coincidentally include the same keyword in the search query. Sifting through search results in the thousands, however, is a daunting task.

Accordingly, we have determined that there is a need to be able to effectively collect the data and/or provide useful marketing information indicative of events occurring on the web. For example, data which indicates where a user has been in prior sessions may be useful in designing future products accessible via the web. We have also determined that there is a need for an architecture and method used to support and analyzer electronic commerce over the World Wide Web for ISPs and CSPs.

We have further determined that there is the need for an architecture and method used to correlate user, application, and access functions. We have also determined that there is a need to provide a tool set that can easily communicate with, or become a subset of, an existing scaleable data warehouse to provide Internet marketing decision support. Unfortunately, conventional architectures and/or techniques are unable to organize and present this information in an efficient manner.

SUMMARY OF THE INVENTION

To overcome the above-detailed disadvantages and shortcomings of the prior art, it is a feature and advantage of the present invention to effectively collect the data and/or provide useful marketing information indicative of the events occurring on the web.

If is another feature and advantage of the present invention to collect data which indicates where a user has been in prior sessions, and which may be useful in designing future products accessible via and for the web.

It is another feature and advantage of the present invention to provide an architecture and method used to support and analyze Internet and/or electronic commerce data over the World Wide Web for ISPs.

It is another feature and advantage of the present invention to provide an architecture and method used to correlate user, application, and access functions.

It is another feature and advantage of the present invention to provide a tool set that can easily communicate with, or become a subset of, an existing scaleable data warehouse to provide Internet marketing decision support.

In the attainment of the same, the present invention provides an architecture and method of supporting, collecting, and analyzing Internet and/or electronic commerce data over the World Wide Web for ISPs. The present invention also includes one or more computer systems employing the method, a computer readable memory storing the medium, and a method for storing the synchronization process in memory and in a storage device.

The present invention combines improved methods of data capture with enhanced analysis techniques to exploit the vast amount of information available through emerging uses of the web, and other internet-based systems. The results can be used as part of a customer's decision support system to allow better (e.g., more statistically valid) business decisions to be made faster.

The present invention concentrates on opportunities within, for example, the ISP sector of the telecommunications industry, and provides ISPs the insight into their customer's services usage, demographics, and behavior patterns. Through this insight, ISPs should be able to support their decisions in such areas as customer retention, service pricing and profitability, and target marketing campaign using analytical methods based on customer and market data. Furthermore, ISPs can provide the knowledge and capabilities to the hosted business customers in order for those customers to gain similar insight into their users to make effective and customer-driven business decisions.

In addition, the present invention is complementary with the current Internet Services Delivery Platform program. One environment where the present invention operates is where the consumer or business customer is able to utilize the ISP's web-based resources through a combination of access and backbone networks which, in turn, are connected to, for example, the global Internet to interface with the rest of the internet resources. The access networks consist of many Point of Presences (POPs) which provide dial-up (e.g., analog/digital, ISDN) access service or dedicated digital (e.g., Frame Relay, ISDN), access service using either modem pool technologies and/or access server/router for the customers.

The access networks also provide Dynamic Host Communication Protocol (DHCP) services, a Proxy Cache Server, and a firewall to facilitate the service administration, address translation, security authentication and/or authorization, and web operation efficiency. The backbone networks, consisting of switches and routers, optimize the transport between the access networks and the Internet Service Center. Internet Service Centers may provide Web Hosting Service and Electronic Commerce Applications.

The present invention provides an architecture supporting value-added services to improve the operation and services of ISPs. The present invention leverages data warehouse and data mining techniques augmented with networking elements and web technologies. The goal of the present invention is to provide the customers with dynamic, flexible, and adaptable interfaces and systems to fully utilize the interactivity of the new Web medium. As a result, decision makers will be able to access decision support information from a secure network in a simple (ease of use), timely (fast enough), usable (valuable) and personalized (customized) fashion. Furthermore, this information will allow the customers to make intelligence decisions and take timely actions to achieve their business goals.

The present invention also is a decision support solution targeted at a Commerce Service Provider (CSP). A CSP is a service provider who offers a full range of value-added services such as electronic commerce applications. Its purpose is to help CSPs to better manage their business, customer base, and services by leveraging areas of expertise in data warehousing and data retrieval.

The present invention was designed in view of the following goals which we have determined:

1. Understand electronic commerce over the Internet.
2. Understand the dynamics of the ISP/CSP business.
3. Determine the type of decision support needed to effectively run an Internet-based service business.
4. Understand how to leverage data warehouse and data retrieval assets into this environment.

The present invention is a data warehouse—data retrieval solution that is tailored to internet-based applications and services. One of its primary purposes is to allow ISP/CSP decision-makers to exploit the intelligence contained in datasets derived from the following environments:

ISP/CSP business operations.

Internet or Web-based applications.

Web-based commerce applications.

Additionally, the decision-support information derived for specific applications can be provided by CSPs to their electronic commerce clients as a service. The "discovery" of knowledge from each dataset is beneficial to CSP's and their customers for the deep insights that it provides into business dynamics and customer behavior.

The scope of WebMining or SmartEC Decisions includes a data warehouse that extracts data from web logs as well as various business operational data bases. The warehouse, in turn, sources three datamarts: one focused on business operations, one on the CSPs customers and one on e-commerce applications and on-line content. On-line content, in this context means, applications provided by the CSP as a service to his/her subscribers. The integration of web data to business data is key.

Web Warehouse and datamarts provide information in a business context, not a web site context. This is an important distinction. Although the system logs from one source of input to the warehouse, the data extracted from them is refined and translated into a business context before it is correlated with other operational data (customer, billing, product, etc.) and put into the warehouse. In other words, the warehoused data is refined to represent products being sold through e-commerce applications, advertisements being seen by customers, specific content being viewed by customers, etc., not URLs. The extraction utilities and translation libraries that provide content for the warehouse will be as important to our offering as the decision-support functions at the back end.

The systems elements of the present invention include:

1. tracking module: systems to collect, interpret, analyze, translate, refine and correlate customer Internet usage, Web/Internet application data, e-commerce application data and other operational data.

2. storage module: Scaleable Data Warehouse to structure, organize, store and manage the data.

3. intelligent control: business decision-support solutions based on knowledge analysis and discovery of the data contained in the storage module.

The benefits of the present invention include:

1. providing decision support and operational information for the ISP to enable new/improved value-added services, allow the implementation of equitable and value-based pricing, achieve better quality of service, manage capacity, and add bill-back capabilities for charge back scenarios.

2. providing to the ISP's customers valuable information such as decision support for proactive, targeted marketing, usage and customer preferences feedback on the web applications, usage information for business access, direct decision support access for specific ISP customers' applications.

In accordance with one embodiment of the invention, a computer system supports and analyzes electronic commerce data. The computer system includes at least one user station transmitting a user request, and at least one server, connectable to the user station, and providing the user station access to external data sources. The computer system also includes at least one data collection and analysis system. The data collection and analysis system includes at least one analysis module performing statistical and analytical analysis of the electronic commerce data for use by a user in performing one or more business decisions, and at least one Internet and/or electronic commerce data warehouse which is responsively connected to the analysis module and separated from external systems. The data warehouse receives the Internet and/or electronic commerce data, and provides access to the Internet and/or electronic commerce data by the user. The Internet and/or electronic commerce data which is stored in the data warehouse is optionally time-stamped, associated with a defined period of time, and subject-oriented including customer and product activities. The data collection and analysis system also includes at least one data tracking module which searches, collects and transforms the Internet and/or electronic commerce data, and transmits same to the data warehouse for storage.

According to another embodiment of the invention, a method of supporting and analyzing electronic commerce over the World Wide Web for commerce service providers is provided. The method includes the steps of determining data elements required for analyzing the electronic commerce over the World Wide Web, and determining whether the data elements are located in open, closed, or registered environments. The method also includes the step of providing a user policy and operation parameters to a user to allow one or more options for data searching and data collection responsive to user specified criteria including when and how the data collection is executed. The method also includes the step of structuring and storing the collected data elements, including parsing, categorizing, indexing, and/or formatting the data elements. The method also includes the step of analyzing the stored data elements, including recognizing at least one of patterns, trends, exceptions of the data elements based on statistic and analytic manipulation techniques. The method further includes the optional step of iteratively performing the previous steps to provide solution navigation, iterative learning, and decision guidance.

One or more computer memory products are also provided. One or more computers memory stores, and one or more computers executes a program including the above process steps.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

For a more complete understanding of the present invention and the advantages thereof, reference is now made to the following descriptions taken in conjunction with the accompanying drawings in which like numbers designate like parts, and in which:

FIG. 12 is a table providing additional hardware, software, database, and information tool options that may be used in conjunction with the present invention.

NOTATIONS AND NOMENCLATURE

Figure 1:
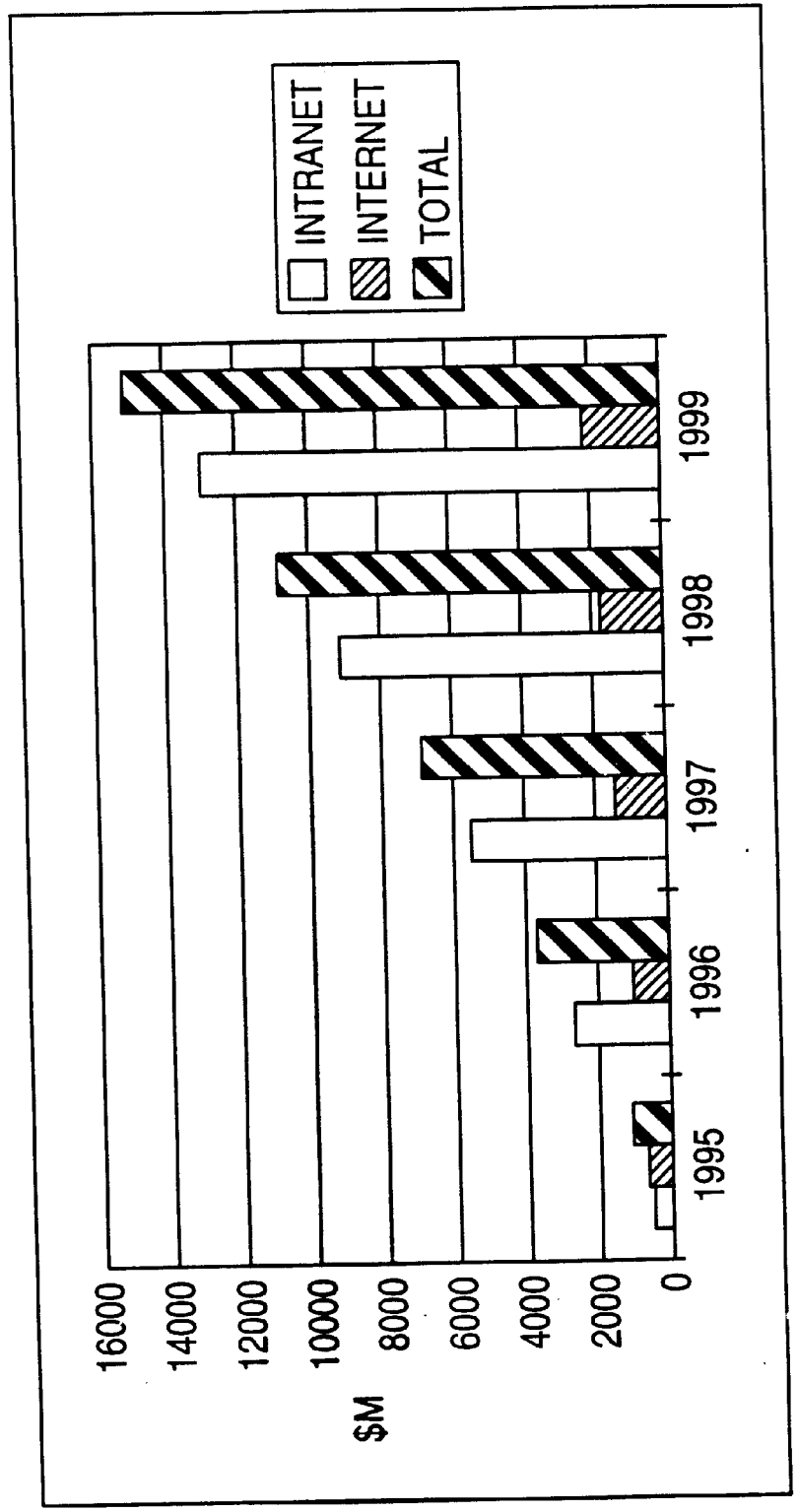
FIG. 1 is an illustration of the dramatic increase sales in World Wide Web servers.
Figure 2:
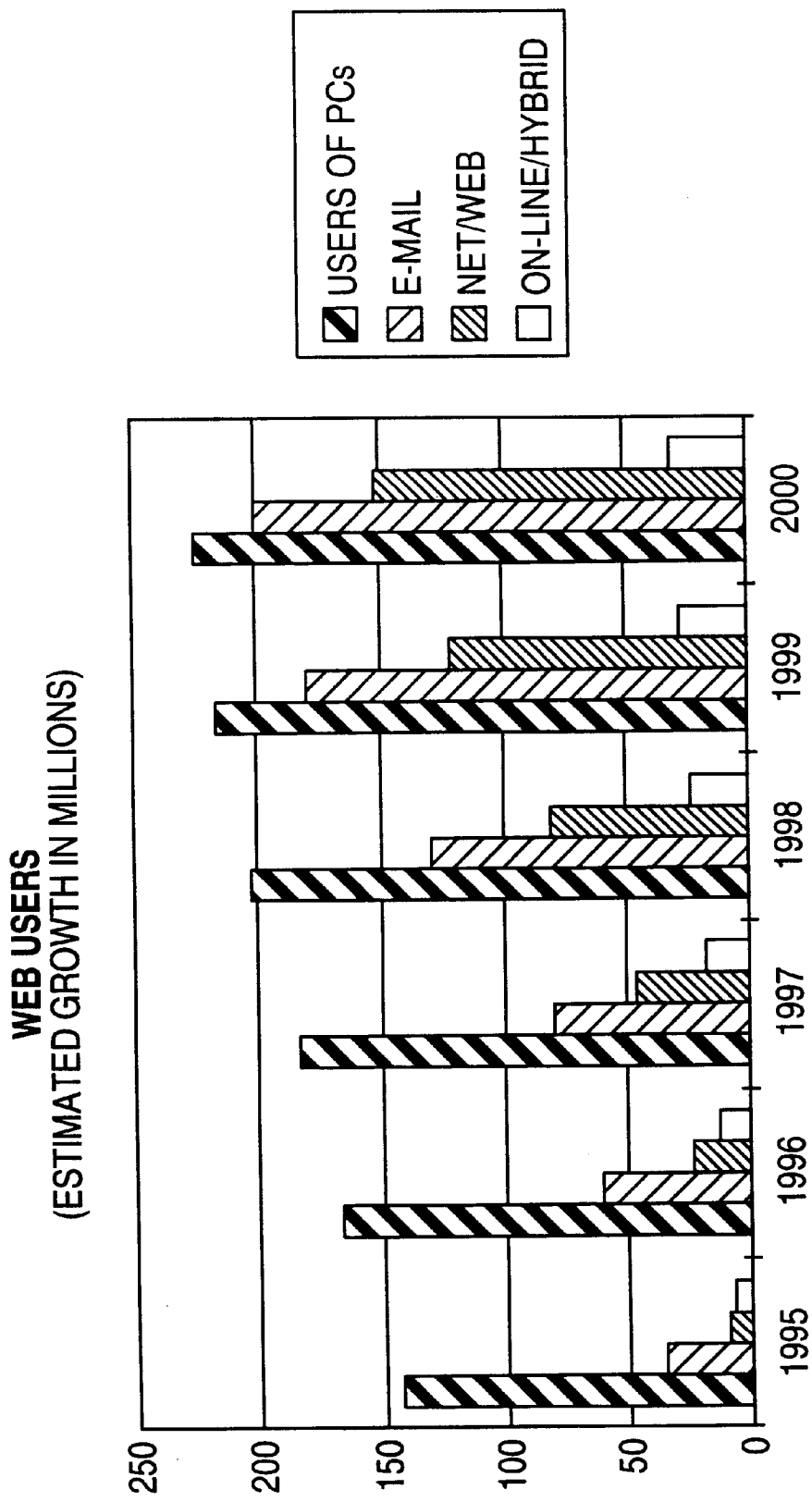
FIG. 2 is an illustration of the estimated growth in web users.

The detail descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with metal operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required methods steps. The required structure for a variety of these machines will appear from the description given.

BEST MODE FOR CARRYING OUT THE INVENTION

The present invention provides an architecture and method of supporting, collecting, and analzing Internet and/or electronic commerce/transactions over or from (hereinafter "over" or "from" are interchangeable) the World Wide Web for ISPs and/or CSPs. The present invention also includes a computer system employing the method, one or more computer readable memory storing the medium, and a method for storing the synchronization process in a memory and in a storage device. The present invention provides tools that provide the necessary collection and analytical capabilities to derive knowledge from raw data collected from the web. In addition, the present invention provides scalability of storage capacity, to meet a customer's growing client needs.

In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present invention combines improved methods of data capture with enhanced analysis techniques to exploit the vast amount of information available through emerging uses of the web, and other internet-based systems. The results can be used as part of a customer's decision support system to allow better (e.g., more statistically valid) business decisions to be made faster.

The present invention concentrates on opportunities within, for example, the ISP sector of the telecommunications industry, and provides ISPs the insight into their customer's services usage, demographics, and behavior patterns, Through this insight, ISPs should be able to support their decisions in such areas as customer retention, service pricing and profitability, and target marketing campaign using analytical methods based on customer and market data. Furthermore, ISPs can provide the knowledge and capabilities to the hosted business customers in order for those customers to gain similar insight into their users to make effective and customer-driven business decisions.

The present invention provides a complete data warehouse/data mining solution for Internet and/or electronic commerce-based applications and services. Its features include:

A modular design that scales in size as well as functionality.

It runs on a series of platforms ranging from single processors to massively parallel systems.

A full range of design and implementation tools.

Extraction and transformation programs tailored for the Internet and/or electronic commerce operating environment.

A choice of relational database management systems that includes MS SQL Server, Oracle, and Teradata.

A comprehensive selection of decision-support capabilities.

The present invention's modular design, hardware platforms and tools enable customers to select a decision-support system that is consistent with the financial maturity of their business. As the business grows and decision-support needs become more complex, the platforms described herein can be upgraded in size as well as functionality.

The present invention provides decision-support capabilities to help CSP's manage their business from several perspectives:

Providing high quality Internet Service to subscribers as a foundation for higher value, more profitable services.

Managing the customer base to optimize profits and value.

Providing on-line content and services as a value-added incentive to attract and retain communities of subscribers, provide sources of advertising revenue, and potentially, to attract commerce clients.

Providing decision-support information, as a potential fee-based service, to business clients to help them manage their Internet, web or Internet and/or electronic commerce applications that are being hosted by the ISP/CSP.

Since a specific ISP/CSP may not be involved in every aspect of the business described above, the present invention's decision-support capability is modularized to allow an ISP/CSP to select the functionality that make sense for his/her business.

The present invention's modular structure allows Internet and/or electronic commerce-based applications and services to be managed from three perspectives:

1. Business Operations Management to monitor and understand:

Key business metrics (revenue, expenses, profitability, subscriber base).

Factors that impact quality of service.

The impact of marketing initiatives or competitive influences.

2. Customer-Base Management to understand the relative value, behavioral characteristics, and preferences of individual subscribers or customers.

3. E-Commerce Management to measure the success of:

E-Commerce Applications—applications provided by the ISP/CSP's or their business clients to conduct commerce over the internet.

On-line content—applications provided by the ISP/CSP to add value to the service offering.

Figure 3:
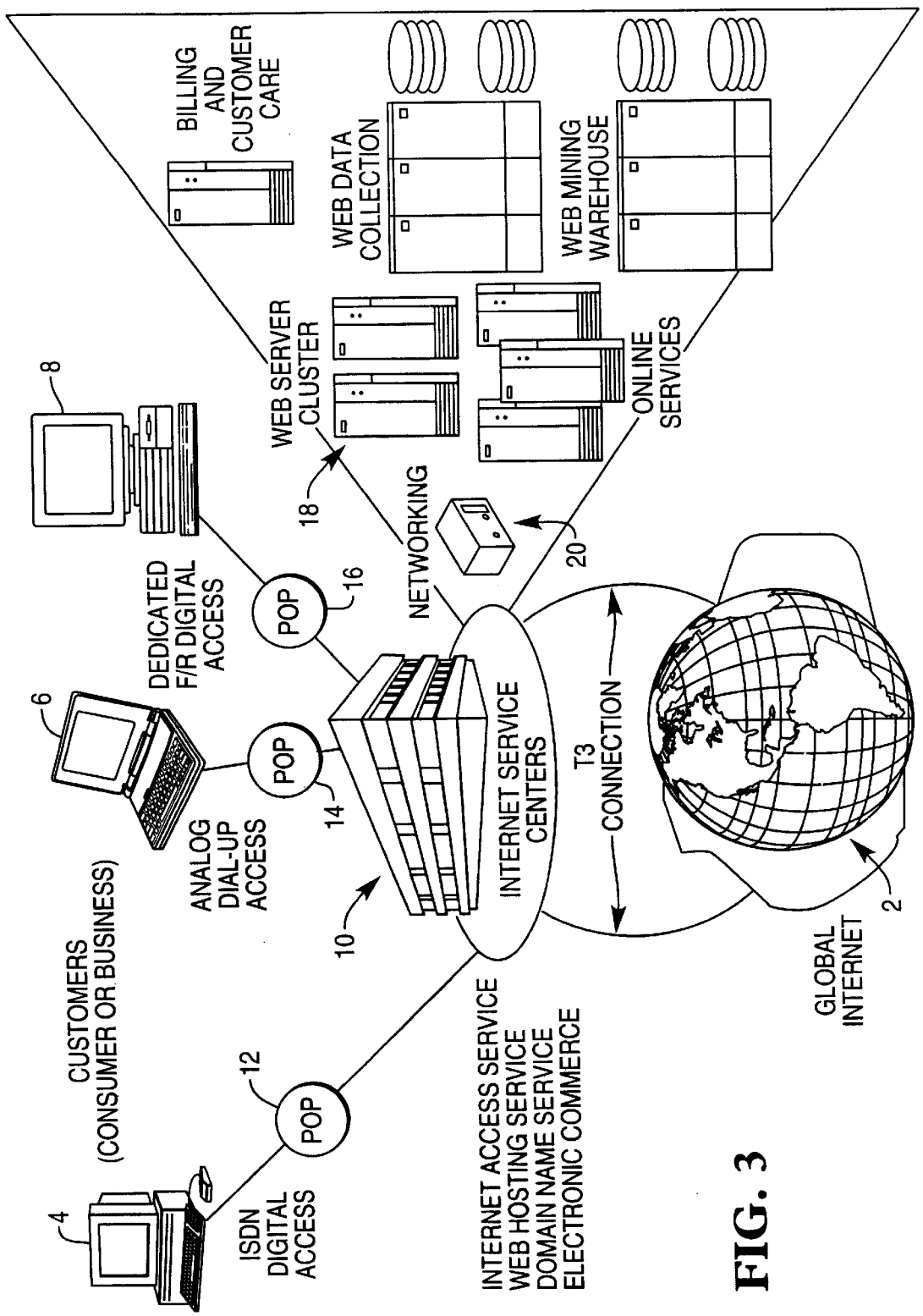
FIG. 3 is an illustration of an Internet Services Delivery Platform program indicative of one environment where the present invention operates.

In addition, the present invention is complementary with the current Internet Services Delivery Platform program. One environment where the present invention operates is illustrated in FIG. 3. Within this environment, the consumer or business customer 4, 6, 8 is able to utilize the ISP's web-based resources through a combination of different access and backbone networks such as ISDN digital access, analog dial-up access, and/or dedicated access lines described below. These networks are, in turn, are connected to the Global Internet 2 via, for example, an internet service center 10 to interface with the rest of the internet resources.

The access networks consist of many Point of Presences (POPs) 12, 14, 16 which provide dial-up (analog/digital, ISDN) access service or dedicated digital (Frame Relay, ISDN) access service using either modem pool technologies and/or access server/router for the customers. The access networks also provide Dynamic Host Communication Protocol (DHCP) services, a Proxy Cache Server, and a firewall to facilitate the service administration, address translation, security authentication and/or authorization, and web operation efficiency. The backbone networks, consisting of switches and routers, optimize the transport between the access networks and the Internet Service Center 10.

Internet Service Centers 10 may also provide Web Hosting Service and Internet and/or Electronic Commerce Applications. One implementation of Internet Service 22 Centers for ISP/CSP is a single site with multiple servers 18 (Web Server Cluster) interconnected through a campus network 20. In addition, Internet Service Centers optionally provide Authentication Service, Domain Name Service, Mail Service, News Service, Provisioning Service, and Network Management Service.

The present invention provides value-added services to improve the operation and services of ISPs. The present invention leverages data warehouse and data mining techniques augmented with networking elements and web technologies. The goal of the present invention is to provide the customers with dynamic, flexible, and adaptable interfaces and systems to fully utilize the interactivity of the new Web medium. As a result, decision makers will be able to access decision support information through a secure network in a simple (ease of use), timely (fast enough), usable (valuable) and personalized (customized) fashion. Furthermore, this information will allow the customers to make intelligence decisions and take timely actions to achieve their business goals.

The benefits of the present invention include:

1. providing decision support and operational information for the ISP/CSP to enable new/improved value-added services, allow the implementation of equitable and value-based pricing, achieve better quality of service, manage capacity, and add bill-back capabilities for charge back scenarios.

2. providing to the ISP/CSP customers valuable information such as decision support for proactive, targeted marketing, usage and customer preferences feedback on the web applications, usage information for business access, direct decision support access for specific ISP/CSP customers' applications.

Figure 4:
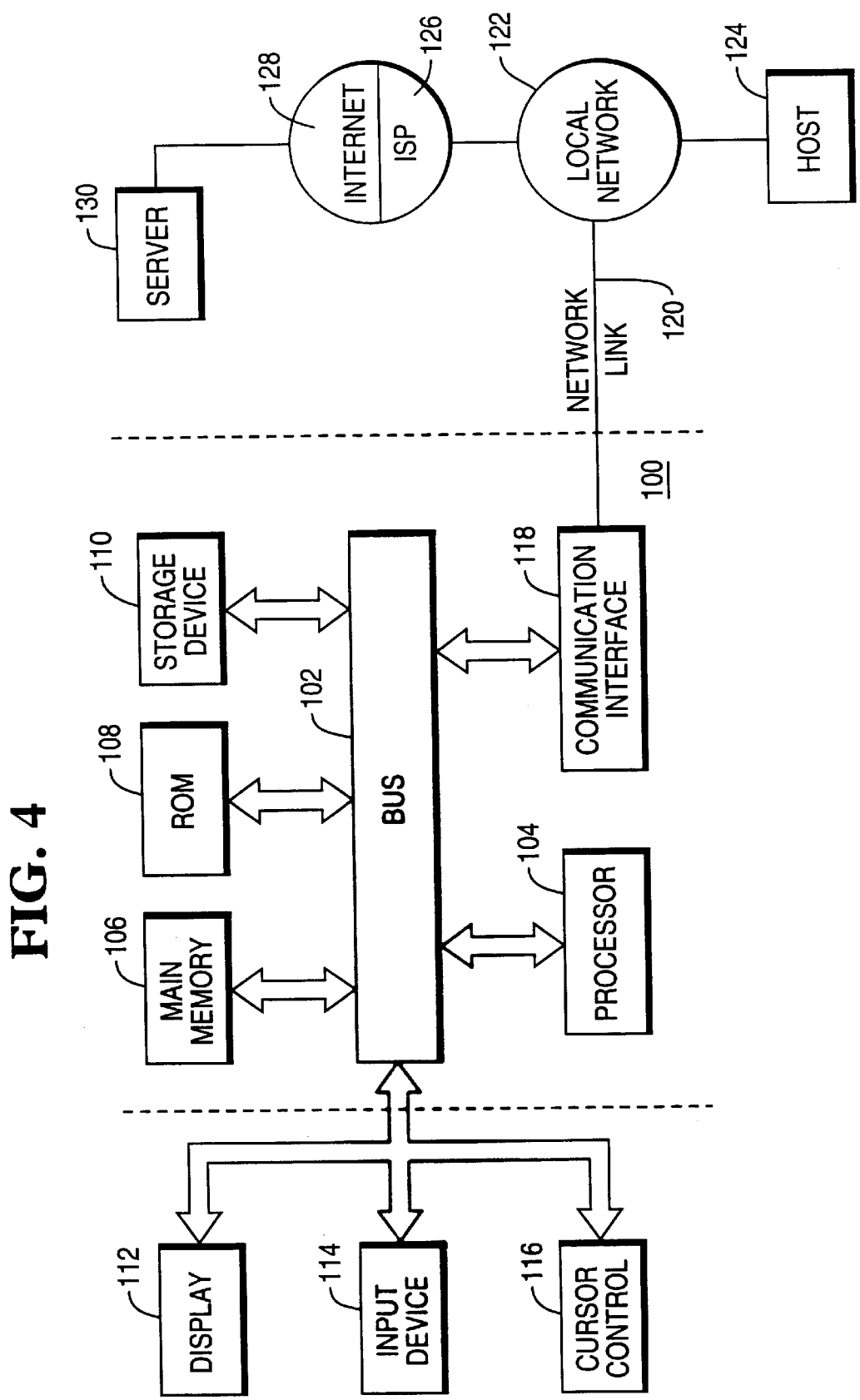
FIG. 4 is a high-level block diagram of a computer system with which the present invention can be implemented.

FIG. 4 is a high-level block diagram of a computer system with which the present invention can be implemented. FIG. 4 is a block diagram which illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104.

Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of one or more computer systems 100 for supporting, collecting, and analyzing Internet and/or electronic commerce over and/or from the World Wide Web for ISPs/CSPs. According to one embodiment of the invention, computer system 100 performs the synchronization in response to process 104 executing sequences of instructions contained in main memory 106. Such instructions may be read into main memory 106 from another computer-readable medium, such as storage device 110.

However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, or PROM, an EPROM, a FLASH-EPROM, any other memory chip or cartridge, a carrier wave embodied in an electrical, electromagnetic, infrared, or optical signal, or any other medium from which a computer can read.

Execution of the sequences of instructions contained in main memory 106 causes processor 104 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to bus 102. Communication interface 108 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an ISP or CPS 126. ISP or CSP 126 in turn provides data communication services through the world wide packet data communication network now commonly referred to as the "Internet" 128. Server 130, web server or proxy server, is used by ISP 126 for data collection purposes. Local network 122 and internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, server 130 might transmit a requested code for an application program through Internet 128, ISP 126, local network 122 and communication interface 118. In accordance with the invention, one such downloaded application provides for the synchronization method as described herein. Of course, the present invention may also be implemented on multiple computer systems.

The received code may be executed by processor 104 as it is received, and/or stored in storage device 110, or other non-volatile storage for later execution. In this manner, computer system 100 may obtain application code in the form of a carrier wave.

Figure 5:
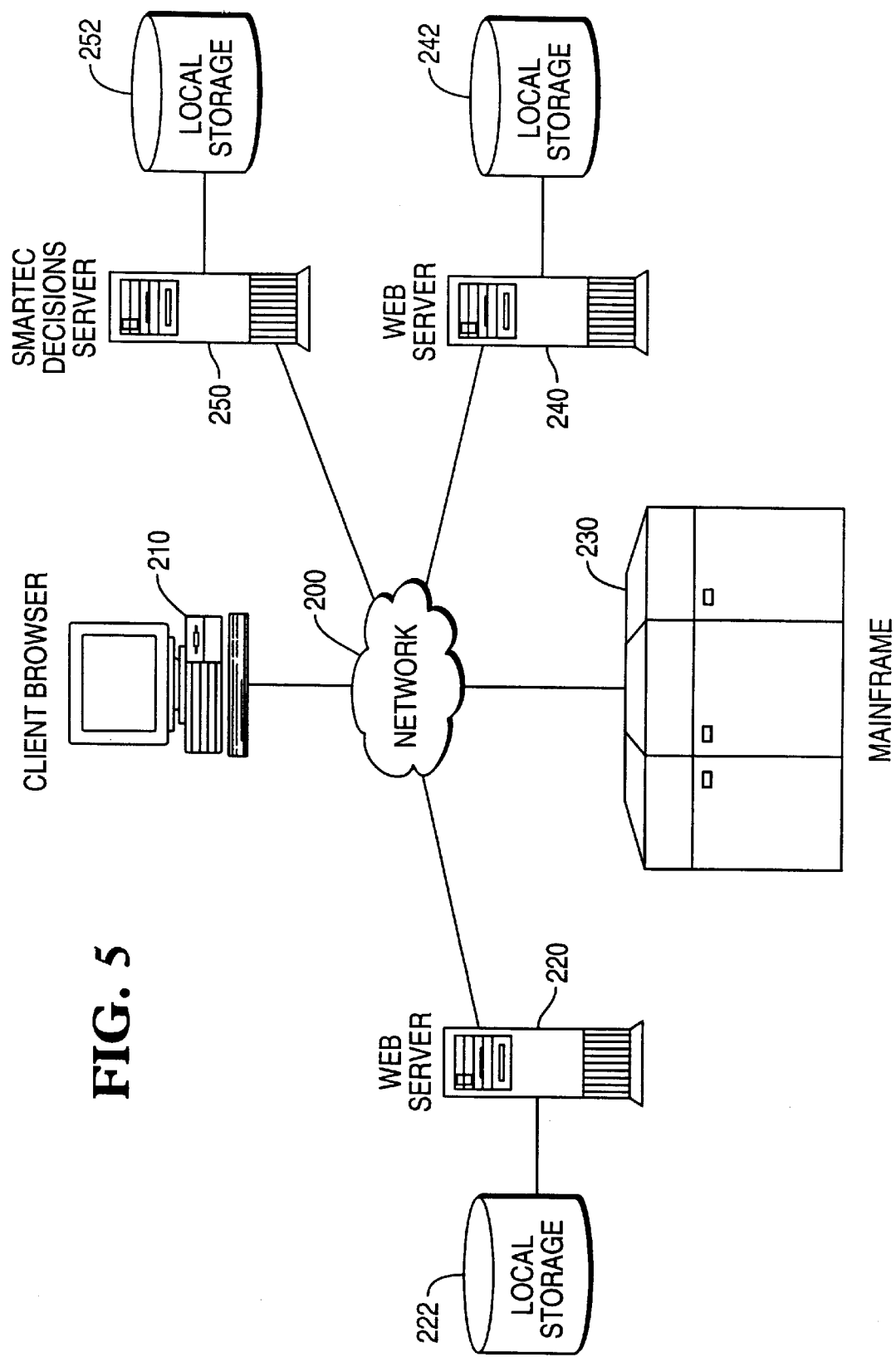
FIG. 5 is a diagram of a network in which the present invention can be implemented.

FIG. 5 is a diagram of a network in which the present invention can be implemented. Referring to FIG. 5, depicted is a network 200 within which the present invention may be implemented. SmartEC server, according to one embodiment of the present invention, gathers information dynamically from one or more data sources, which may be located at different servers and may have incompatible formats, and outputs the information for the user according to predetermined criteria discussed below.

The predetermined criteria may be defined by human operators according to their own needs, purposes, and preferences as part of the configuration of the server. Alternatively, the predetermined criteria may be determined based on system-defined user privileges. For example, users with a higher clearance, security and/or seniority level may be able to obtain more information than users with a lower clearance, security, seniority level. Multiple information models and visual representations may be defined for any server.

A user may access the web server 220 by executing a web browser at client 210. Web browsers are well-known in the art, and are readily available from such corporations as Netscape Communications Corp. and Microsoft Corp. In order to access the web server 220, the user at client browser 210 activates hyperlink having a URL (Uniform Resource Locator).

In the exemplary URL, the network address of the web server 220 is specified as "www.server.com" and the optional portion of the URL after the question mark (?) hold user specified parameters. When the hyperlink is activated, the web server 220 receives a request to initiate an session, specified by parameters embedded in the URL. In response, the web server 220 gathers information from one or more data sources.

The data or information sources can have incompatible formats, e.g. web page, relational database, spreadsheet, text file, etc. The data sources can be stored at a plurality of sites, for example, locally with respect to the web server 220, such as a hard disk at local storage 222, or externally at another site in the network, e.g. at mainframe 230. In fact, the data source can even be another, remote information web server 240. A SmartEC Decisions server 250 takes the information from web server 240 and translates and puts it into the WebWarehouse.

Figure 6:
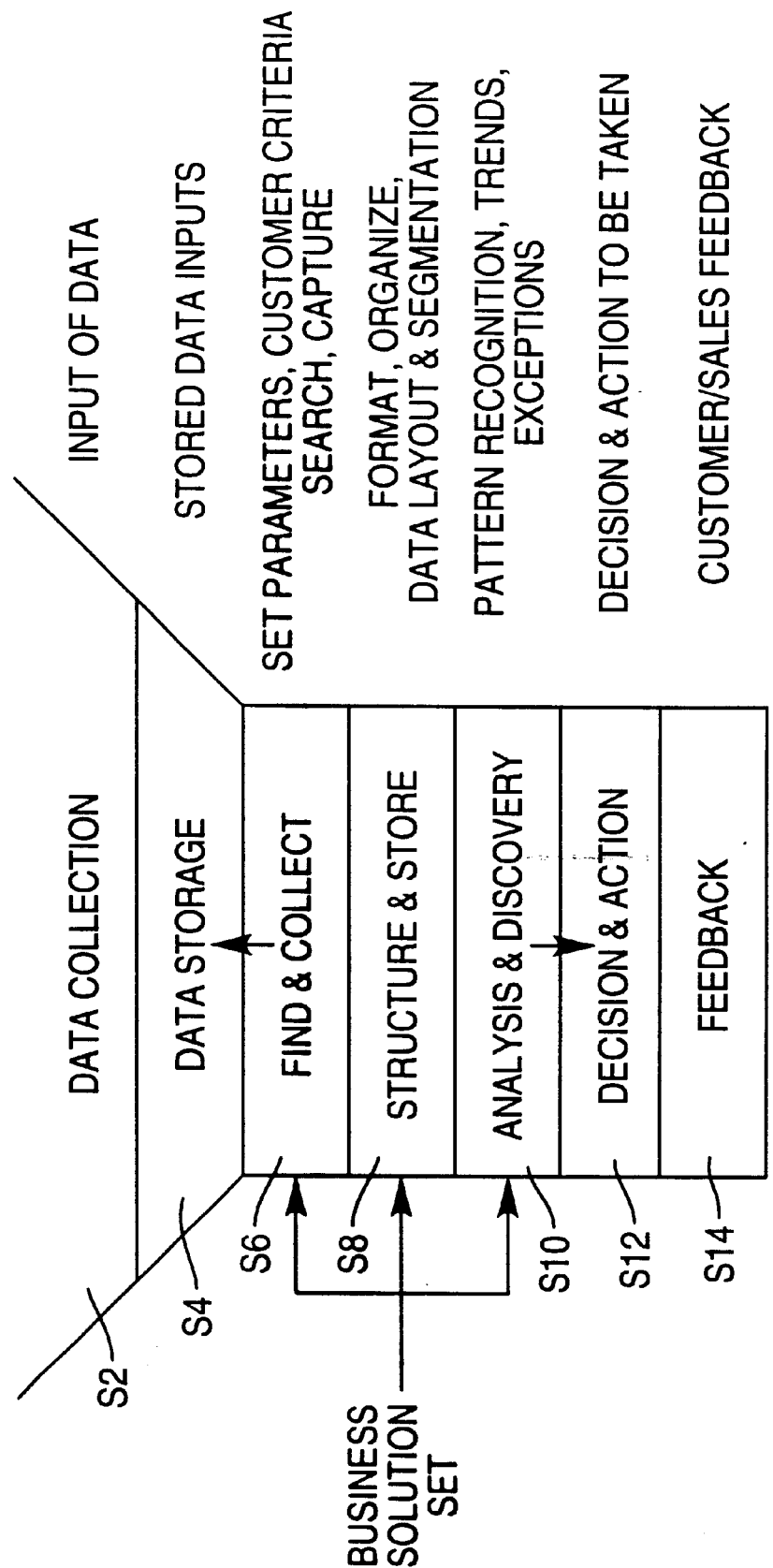
FIG. 6 is a flow chart of the framework of the decision analysis process of the present invention.

The decision analysis process shown in FIG. 6 describes a framework of what is required to provide the business solution set. The architecture and process of the present invention includes the necessary data to solve specific business problems. As opposed to many traditional methods of collection and storage for data warehouse and mining, the present invention focuses on data collection of Web/internet information and data storage methods using Web technologies in distributed environments.

As a result, data collection and data storage processes S2, S4 are focused and continuous efforts, instead of general and discrete approaches. The present invention also allows the proper archive of the collected information for statistic and analytic manipulation. The present invention effectively and interactively presents the resulting business solutions.

Specifically, three aspects of the processes are provided by the present invention business solution set:

1. Find and collect: this process S6 must determine what data elements are required. It is also necessary to know whether the data is available in open, closed, or registered environments. In order to execute the capture and collection of the data, the ability to set policy and operation parameters must be provided to the user to allow options for data searching and collection based upon their dynamic and changing business needs. Furthermore, this process should also deal with when and how the data collection should be executed.

The whereabouts of the required data, sometimes, can be known or unknown, internal or external. The ability to locate the data and synthesize the multiple sources of data into useful information is important as the technology evolves and matures. The following data collection options are also provided:

real-time: the time between locating the data and collecting the data is negligible or about at the same time. These two activities are closely related and the actions are closely coordinated.

on-line: the time between locating the data and collecting the data is short because either (1) the data requires a certain duration to accumulate meaningful volume, or (2) the importance of the data collection is not imminent. These two activities are loosely related and actions are loosely coordinated.

off-line: the time between locating the data and collecting the data is long and these two activities are separate and can be unrelated events, and actions need not be coordinated at all.

2. Structure and store: this process S8 involves parsing, categorizing, indexing, and formatting of the collected data. The processed data must be organized in a structured way (i.e., the data layout and segmentation). The intent of this process is to arrange the data and/or information in a form where useful long term and policy-related knowledge can be easily used and derived.

3. Analysis and discovery: this process S10 recognizes the patterns, trends, and exceptions of the data and/or the information based on statistic and analytic manipulation techniques such as clustering, artificial intelligence, etc. The goal is to provide the customers with recommended actions for their decision making S12.

All these three processes are iterative in nature. The feedback process S14 among the processes, and also from the users and customers, will establish the foundation of the continuing improvement. In addition, all three processes require user-friendly interfaces to facilitate information exchange. These user interfaces are important parts of the present invention to allow solution navigation, iterative learning, and decision guidance.

The following outlines the system elements and preliminary data required for the present invention. The present invention intends to complement the Internet service delivery platform and provide the differentiation for our complete suite of Internet solutions for Internet Service Providers and/or Commerce Service Providers in the communication industry. The assumptions of the configuration are:

all systems are interconnected via Internet, all systems (users, servers) are Web-accessible.

all ISP specify data (servers, database and warehouse) are accessible on a secure network.

The approach we take in the present invention is to establish a generic solution framework, but with specific focus, at least initially, on the vertical industry (ISPs in the communication industry) and functionally on customer retention and profitability. The potential applicability for horizontal platform functionality requires further investigation.

Figure 7:
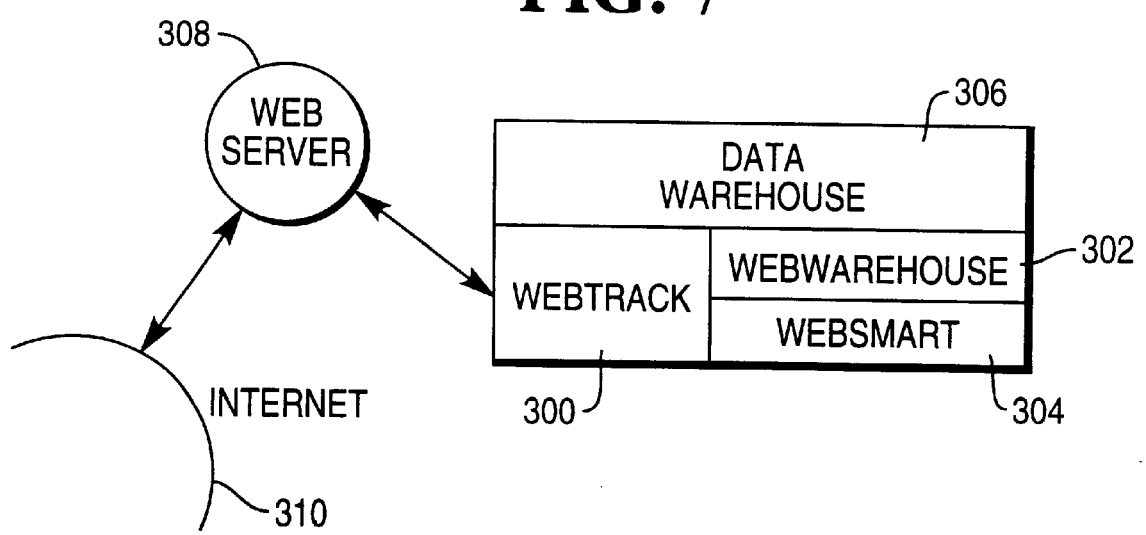
FIG. 7 provides a functional view of the system's elements in an Internet environment.

Each of the processes (find and collect, structure and store, analysis and discovery) corresponds to a system component in this section. FIG. 7 provides a functional view of the system's elements in an Internet environment. The system's elements of the architecture of the present invention are:

1. Tracking module (WebMap of WebTrack) 300: systems to find, search, collect and capture detailed customer Web/Internet and/or electronic commerce usage and demographics data.

2. storage module (WebWarehouse) 302: Scaleable Data Warehouse to structure, organize, storage and manage detailed customer Web/Internet and/or electronic commerce data.

3. intelligent decision support tool (WebSmart and WebSmartSuite) 304: business solutions based on knowledge analysis and discovery of detailed customer Web/internet and/or electronic commerce data.

In addition, a general data warehouse 306 is also provided for storage of non-web specific data, as well as possibly some web specific data based on user preferences. Each of the above elements are responsively connected, directly or indirectly, to web server 308, providing access to the internet 310.

In addition, the presentation of the information is also important to the decision support process. It is a delivery media to distribute the information and intelligence to the decision maker in a timely fashion. Therefore, all these systems provide consistent, personalized, and easy to use customer interfaces. These user interfaces should also have the capabilities to operate in real-time, on-line, and/or off-line.

Figure 8:
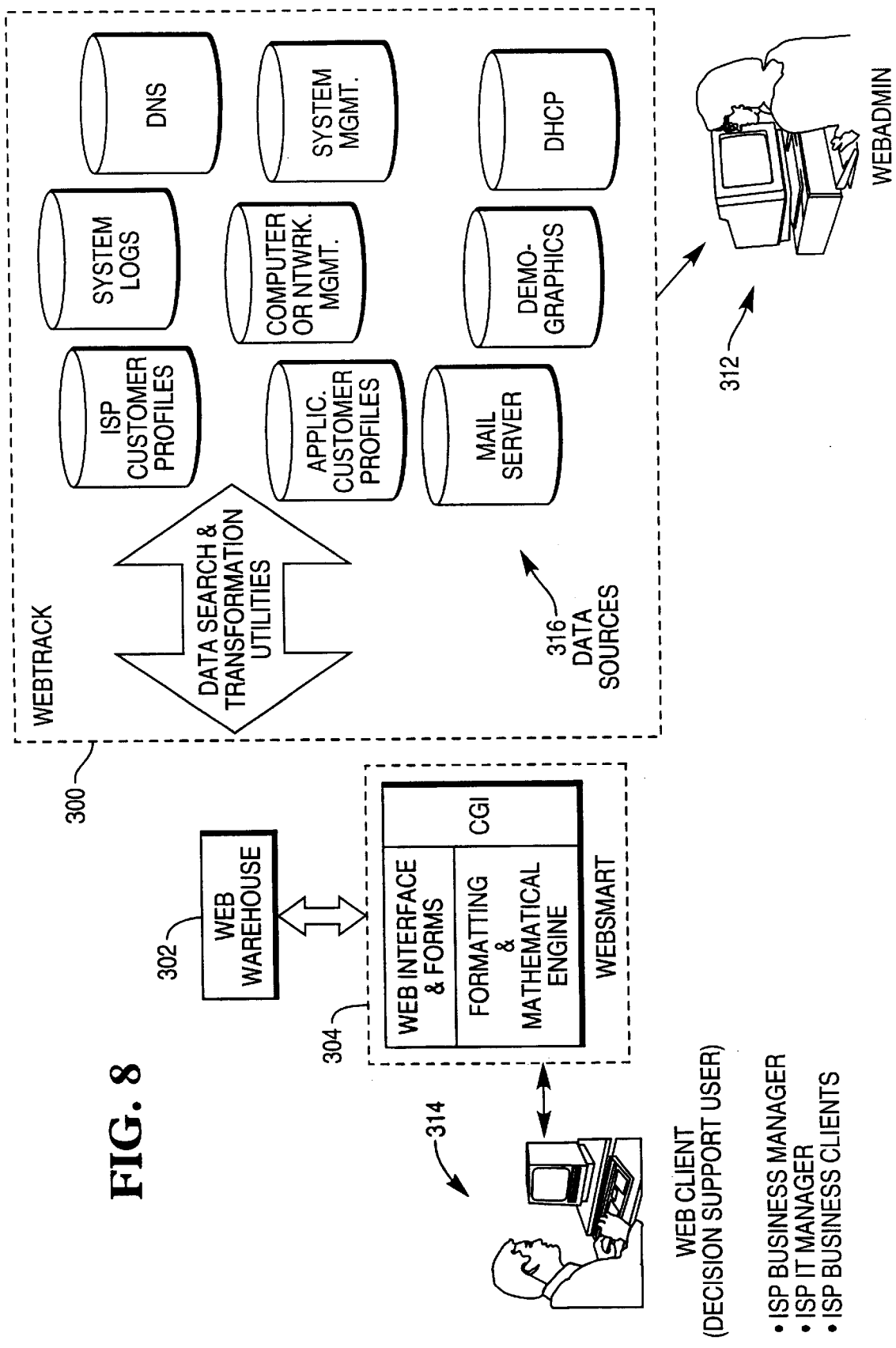
FIG. 8 provides an expanded view of the architecture of the present invention.

FIG. 8 provides an expanded view of the architecture of the present invention. In FIG. 8, the users define and formulate the business questions and determine the queries of the data collected. Three major decision support user categories of the present invention are:

1. ISP/CSP business managers: the present invention allows them to better understand their customers' needs and conduct effective marketing and sales support to achieve their business objectives.

2. ISP/CSP IT (Information Technology) Managers: the present invention enables them to obtain insight into the ISP's IT operations and provide ways to improve the ISP's services.

3. ISP/CSP business clients: For the ISP's hosted business clients, the present invention enables ISPs to provide their business clients with detailed understanding about the clients' business needs.

These users should be able to use the present invention through any Web client or networked client with properly defined access privileges and procedures. The interface must allow dynamic interaction between the users and the systems to accommodate the new queries and questions resulting from the changing business needs. This user input is handled according to the current Web and user interface technologies such as HTML forms and Common Gateway Interface (CGI) interacting with the other elements (WebSmart, WebWarehouse, WebAdmin) of the WebMining systems.

WebSmart 304 provides the mathematical Engine to perform the static and analytical manipulation of the data and obtain the knowledge and intelligence for business decisions by the Smartec client 314.

WebWarehouse 302 is separated from the operational Web-accessible systems such as Web servers and Web-Based databases, but is populated by data from these systems. It exists to make the data available for interrogation by the business users from the perspectives of an enterprise interest and associated business benefits. The data in the WebWarehouse is preferably time-stamped and associated with a defined period of time, and is usually subject-oriented such as customer, product, activity.

The change of this data in the WebWarehouse occurs as a result of decision support requirements, and update from one of the data sources 316. Therefore, the WebAdmin 312 must have the capabilities to determine and control the search request and information flow between the operational databases and the WebWarehouse. WebAdmin must also have the ability to initiate the structural change, addition, and deletion of data in the WebWarehouse in an appropriate time based on the detection support user's needs.

WebTrack 500 is the vehicle to search and transform the information from the data sources 316, and deliver the information to the WebWarehouse for storage using the secure network. The data sources preferably includes the system logs (access logs, agent logs, mail logs, communication server logs, accounting logs and referer logs) on the Web server, proxy server or mail server, and the user profiles (ISP/CSP customers, visitors, and transient travelers (passthroughs)).

From the Web operational perspectives, three major sets of information for Web applications and Web access must be also considered to determine the collection of useful data: (1) who is visiting, (2) what they are looking at, and (3) what resources they are using. There are other data sources available related to DNS, DHCP, and the Network Management Systems (NMS) which facilitate Web operations. In addition, the data sources should also consider third party analysis applications (based on the Web data).

The data required for the WebWarehouse depends heavily on the scope and objectives of the business problems to be solved. A preliminary and generic example of the WebWarehouse intended for solving the problems as ISP/CSP may face is described as follows:

From the user perspective, there are, at least, two types of users: visitors and the ISP's customers. The ISP's customers are those who subscribe to the ISP services by paying fees to the ISP. The visitors are those who access the services via other Web servers without payment to the particular ISP. The profile data related to the ISP/CSP customers should include, for example:

company name
company administrator name
user name
address including city, state, zip code
phone number including day, night and fax
user login name and/or IP address
email address
chosen Point of Presences
credit card information including card type, number, name on the card
domain name
billing contact
user selection of ISP's services including dial-up service, business ISDN service, corporate email service, server hosting, corporate web services.
user chosen service plans and associated pricing information.

The visitor profile data, in addition to the domain name and IP addresses, depends on how much information the visited applications can entice the visitors to provide and what the visitors are willing to share with the ISP.

From the Web operational service perspective, three activities are correlated: user, application (including hosting and commerce services), and access. Web servers contain minimal information about access from the networking point of view. The capture of Web access activity requires interfaces to other network accessible systems such as modem pools and routers. The user activity provides, for example, the following data;

domain names and IP addresses of the systems/users making the requests
login names and IP addresses of the client systems accessing the site
referer lists from where users are accessing the server
most common visitor domains
most common external references
first time visitors
returning visitors
most frequent visitors
visitors per visitor category
visits per visitor category
user demographics including geography, age, income, professional.
where do people come from when accessing this page
where users or subscribers/visitors go from this page.

The activity provides, for example, the following data:
hits to the site
new contents for the site
number of files sent
hot hits (most frequent accessed files)
most popular pages
types of transactions
date and time of transactions
time spent on a particular page
average time spent on a page
how many leave before the first page arrives
details of most popular objects
details of most popular pages
least popular objects
least popular pages
most popular entrance pages
most popular content categories
next click analysis
visits per content category
visits to content combinations In order to understand the efficiency of the ISP/CSP operation, it requires an underlying resource characterization to inter-relate the above activities. There are three aspects of this characterization: what the structure is (necessary Web site application/service structure, and the relationship—one-to-one, many-to-one, many-to-many), what actually happens (logs), and how well the systems are performing (performance). This characterization (please note that this remains to be defined) is important in setting up a useful WebWarehouse and provide adaptable services for the present invention. Sample data related to resource utilization includes, for example:

protocol used
file sizes transferred
response time
peak traffic periods
update interval
most common browser types
retrieval method
error activities
accounting information including billing records.

The present invention can be standalone or co-exist with the web server, data bases, and data warehouse. The present invention accommodates both NT and UNIX with appropriate systems tools and capacity to enable access to other web servers and other web-accessible systems and interest-based systems or networked such as NMS and special application servers. The present invention operates, for example, in a pure ISP environment initially. The capabilities of the present invention are also extendable to the Mixed ISP and SmartEC (or ISP decision support) systems provider environment (such that SmartEC systems providers can offer professional services), the Intranet environment for business customers, and provide business customers using ISP/CSP hosting and Internet and/or electronic commerce services a logical perspective of how they are operating.

Figure 9:
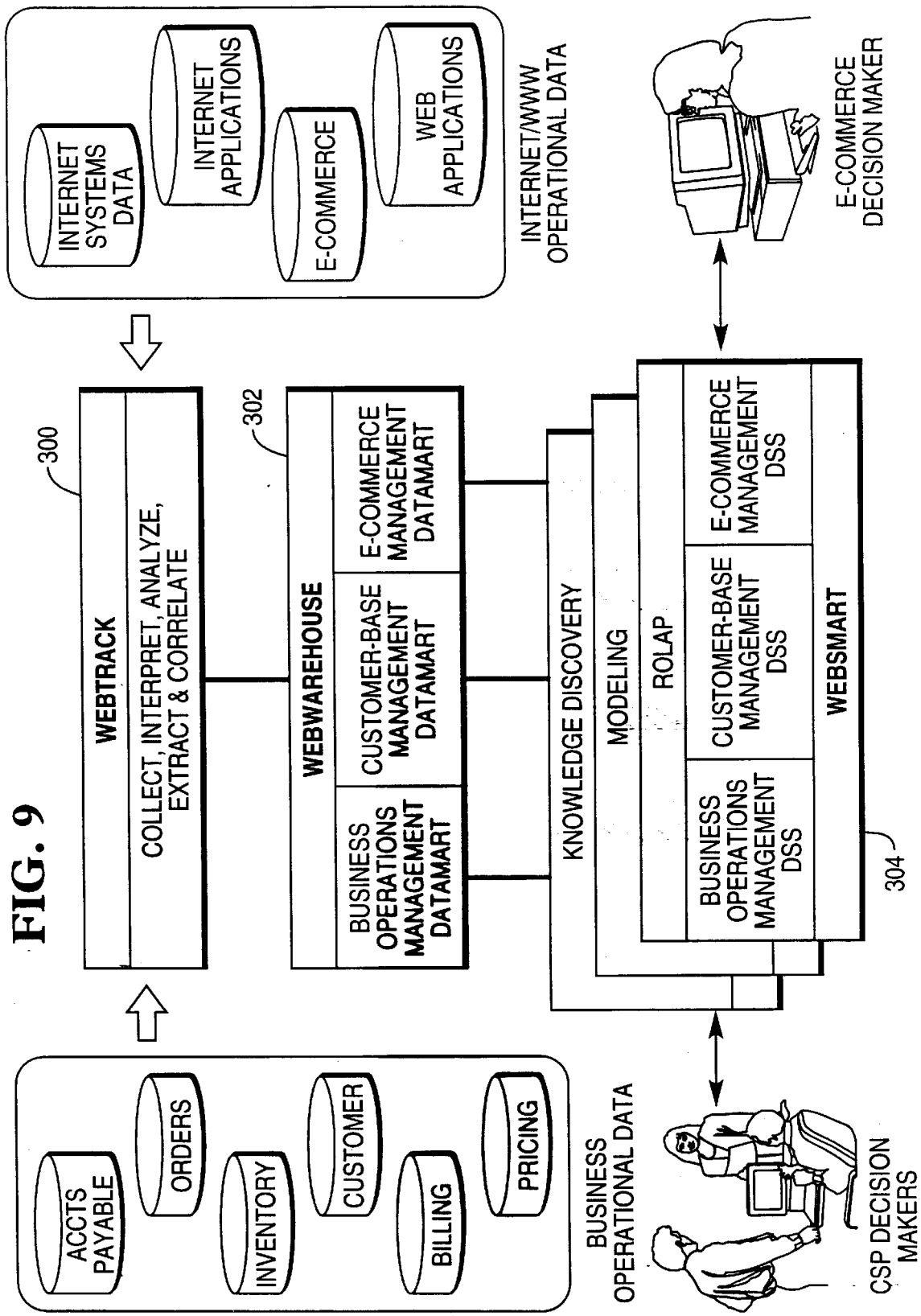
FIG. 9 is an illustration of the various data sources and outputs for the present invention.

As depicted in FIG. 9, the data to populate WebWarehouse 302 originates from many sources. The value of the present invention lies in its ability to integrate business operational data with web-specific and Internet and/or electronic commerce data to provide decision-support information about Internet/Web applications in a business, rather than a technical context.

WebMap or WebTrack 300 consists of the programs and database structures designed to:

Collect data from the appropriate sources.

Interpret, analyze, translate, and refine the source data in order to extract the required data sets to implement decision-support functions.

Correlate disparate data sets prior to populating Web-Warehouse 302.

WebWarehouse 302 furnishes the information necessary to manage an Internet Service or an E-Commerce business from the perspective outlined above. Different WebWarehouse views can be extracted to provide an information framework to drive specific decision-support efforts. WebWarehouse also includes tools that provide the appropriate logical design, physical design and documentation. Design templates are available to identify the required data elements from the customer's operational databases. There are also processes and tools to integrate customer-specific elements into WebWarehouse's core design. This architecture described herein may also be implemented as a datamart. A datamart is structured to support specific decision-support needs, typically at a departmental level.

WebSmart 304 provides decision-support modules with feature sets that vary in the sophistication of the business information being provided. In this context, there are several levels of decision-support provided by WebSmart.

functionality that provides a basic level of decision-support functionality functionality that can be addressed by standard OLAP decision-support software. At this level, WebSmart provides a set of pre-formatted report templates, filters and metrics for each decision-support feature set. There are tool sets for each DSS software package supported by MebMining.

functionality used to detect previously unknown, but potentially useful relationships between different types of data. Here, WebSmart provides a set of templates oriented to help solve specific business problems such as customer retention, market basket analysis, etc.

Additionally, Metadata is provided for each of the supported OLAP or Knowledge Discovery (KD) tools, as appropriate. Metadata defines the data views necessary to produce the outputs required for each decision-support feature set. Each metadata package also includes templates to integrate customer-specific data into the standard design.

Figure 10:
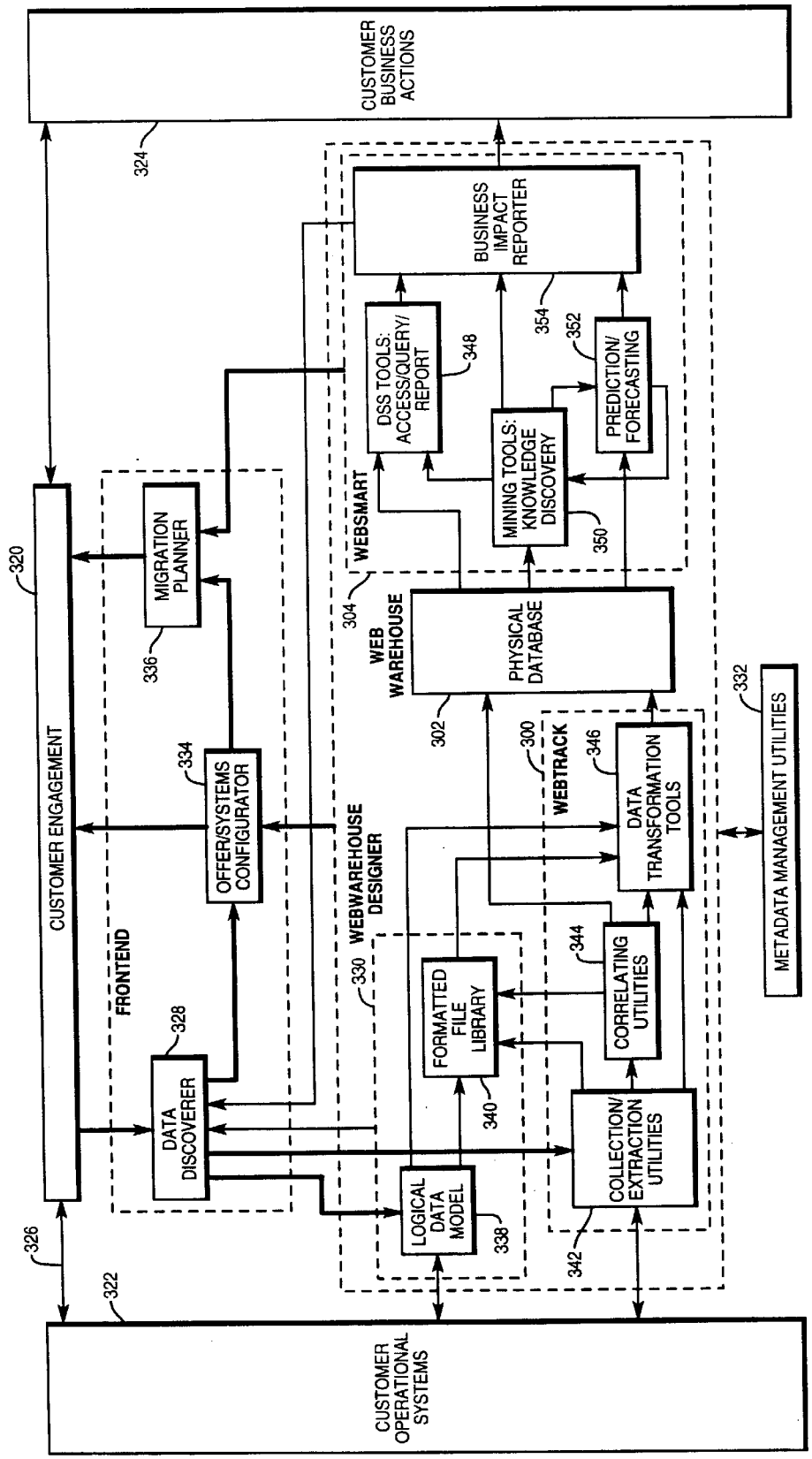
FIG. 10 is a detailed illustration of how the components interact with each other and the customer environment in the present invention.

FIG. 10 is a detailed illustration of how the components interact with each other and the customer environment. The present invention works under three environmental factors. Customer engagement 320 provides key information on customer needs. These needs are influenced by how well customer operational systems 322 are running and how customer business actions 324 are executed. The customer engagement process has a major influence on the design. The components must interact with customer operational systems to determine the proper model for WebWarehouse 302 and how the information can be collected and extracted for WebMap or WebTrack 300. Finally, the customer business actions depend heavily on what knowledge customers can get from the products and solutions.

WebSmart 304 is intended to provide the best possible knowledge for customers to conduct their business given a specific business problem. There are six key components in the present architecture:

WebMining Front-end 326 (Data Discoverer 328 and Offer/System Configurator 334 and Migration Planner 336)

WebWarehouse Designer 330

WebMap or WebTrack 300

WebWarehouse 302

WebSmart 304

WebMining Metadata Management Utilities 332

The WebMining Front-end facilitates the interaction between WebMining solutions and customers. Data Discoverer automates the discovery process to enable service practitioners to systematically find the necessary information for defining customer problems via customer engagement. The output of the Data Discoverer will impact the WebWarehouse design and determine the effectiveness of the collection and extraction utilities of WebTrack.

The offer/systems configurator and migration planner function (WebMining Platform Selector) will help both customers and WebMining sales and service personnel to determine, depending on customer needs, what hardware, software and associated applications are required and how customers can move from one set of platforms to another based on the changing customer requirements.

WebWarehouse Designer contains two main components: logical data model 338 and formatted library 340. The logical data model provides overall descriptions of what the WebWarehouse is. This description will determine how well the WebWarehouse can integrate additional datasets and how effective the access of WebWarehouse will be for queries and reports. Formatted File Library is a by-product of conducting standard Collection/Extraction Utilities 342 and Tracking Utilities 344. The Formatted File Library provides the intermediate classifications such as process characterizations, customer descriptions, preference determination, and behavior patterns. These classifications can be reused indifferent technical process and different customer problems.

WebTrack collects and extracts information from customer operational systems. The collected and extracted information will be further manipulated to determine the identity and characterization of the users via Tracking or Mapping Utilities. Data Transformation Tools 346 load the data into the WebWarehouse based on the principles of the WebWarehouse Designer and the information discovered during the execution of Collection/Extraction Utilities and Tracking and Mapping Utilities.

WebWarehouse is the physical repository of Smartec or WebMining information.

WebSmart provides the intelligence of the present invention. Decision Support Systems (DSS) tools 348 provide the access, query, and report capabilities using WebWarehouse. Mining tools 350 enable the present invention to discover hidden knowledge from existing data and information. Furthermore, Mining tools could establish systems model such that Prediction/Forecasting 352 capabilities can be realized. All these intelligence can be formulated such that the business impact can be clearly crystallized via Business Impact Report 354.

Since there are multiple systems and databases involved in providing WebMining solutions, it is important to properly manage, coordinate, and reconcile the different sets of metadata. Metadata Management Utilities serve as a control center of these different metadata for the present invention.

The above architecture is mainly examined from input and output process perspectives among physical components. The physical platforms required for the architecture described herein are described in FIG. 11. The present invention is capable of running on, for example, an NT or UNIX server and can be accessed by users through a browser or DSS/Data Mining Tools GUI interface via a network connection.

Figure 11:
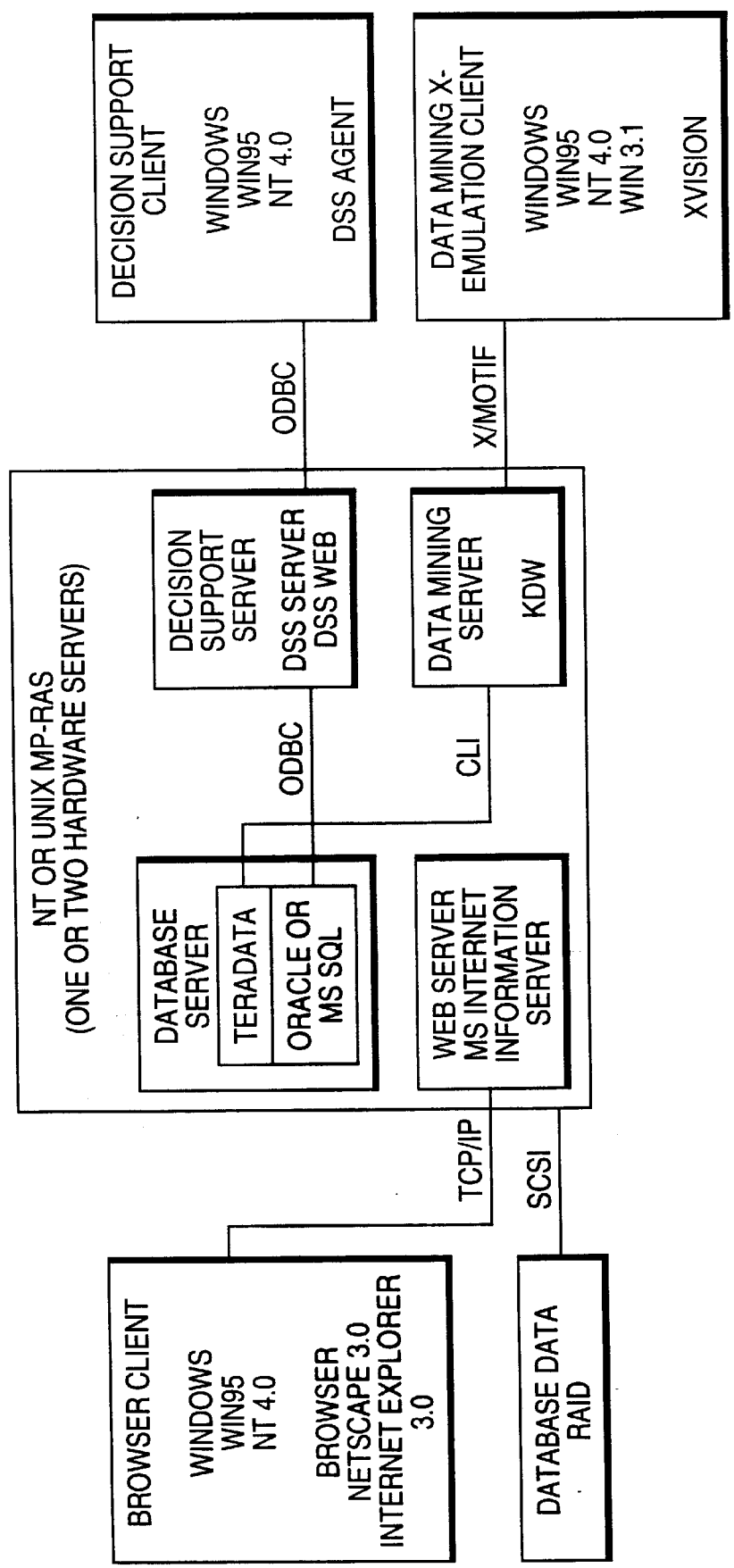
FIG. 11 provides an overview of the architectural components in various configurations of the present invention.

The system environment in FIG. 11 provides an overview of the architectural components in various configurations. DSS/Data Mining can run locally on the database platform or remotely on an NT or UNIX server attached to the database server via a network connection. FIG. 12 is a table providing additional hardware, software, database, and information tool options that may be used in conjunction with the present invention.

Accordingly, as described above, the present invention combines improved methods of data capture with enhanced analysis techniques to exploit the vast amount of information available through emerging uses of the web, and other internet-based systems. The results can be used as part of a customer's decision support system to allow better (e.g., more statistically valid) business decisions to be made faster.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be restored to, falling within the scope of the invention.

What is claimed is:

1. A method of supporting and analyzing electronic commerce data for electronic commerce service providers using a computer, comprising the steps of:
    (a) determining data elements required for analyzing the Internet and/or electronic commerce over the World Wide Web;
    (b) providing a decision support user with one or more options for data searching from multiple data sources in the form of operational activities responsive to decision support user of operational activities responsive to decision support user specified criteria;
    (c) structuring and storing the data elements obtained in said step (b), including parsing, categorizing, indexing, and formatting the data elements;
    (d) analyzing the data elements stored in said step (c), including recognizing at least one of patterns, trends, exceptions of the data elements based on statistic and analytic manipulation techniques; and
    (e) iteratively performing said steps (a), (b), (c), and (d), to provide at least one of solution navigation, iterative learning, and decision guidance.

2. The method according to claim 1, wherein said step (b) further comprises providing the decision support user with one or more options for data collection, the data collection comprising at least one of:
    (1) substantially real-time data collection where a first time between locating the data elements and the data collection is substantially a same time,
    (2) substantially on-line data collection where a second time between locating the data elements and the data collection is substantially dependent on at least one of the data elements require a certain time interval to accumulate a predetermined volume, and the data collection is not imminent but requires at least some coordination, and
    (3) substantially off-line data collection where a third time between locating the data elements and the data collection require no coordination.

3. The method according to claim 2, wherein the decision support user specified criteria include when and how the data collection is executed.

4. The method according to claim 1, wherein said structuring step (c) further includes the step of organizing the data elements in a structured format in accordance with a data layout and segmentation.

5. The method according to claim 1, wherein said analyzing step (d) further includes the step of providing the decision support user with one or more recommended actions for subsequent decision making.

6. The method according to claim 1, wherein said decision support user specified criteria comprise customer-based management-related-criteria for analyzing profile data including at least one of relative value, behavioral characteristics, and preferences of individual subscribers who subscribe to at least one service provided by at least one of the electronic commerce service providers, and non-subscribers who do not subscribe to any service provided by the electronic commerce service providers.

7. The method according to claim 6, wherein the profile data related to the subscribers includes:
    company name
    company administrator name
    subscriber name
    address including city, state, zip code
    phone number including at least one of day, night and fax
    subscriber login name and/or IP address
    email address
    chosen Point of Presences
    credit card information including card type, number, name of the card,
    domain name
    billing contact
    subscriber selection of services including dial-up services, business ISDN services, corporate email service, server hosting, corporate web services, and
    subscriber chosen service plans and associated pricing information.

8. The method according to claim 6, wherein the profile data related to the non-subscribers includes non-subscriber profile data, responsive to information a visited application is able to obtain from the non-subscriber and what the non-subscriber is willing to enter into the visited application.

9. The method according to claim 1, wherein the following operational activities are linked including a client activity, an application activity including hosting and commerce services, and access activity.

10. The method according to claim 9, wherein the access activity comprises interfacing with other web-accessible systems, including at least one of modem pools and routers.

11. The method according to claim 9, wherein the client activity comprises the following data:
- domain names and IP addresses of systems and/or users making requests,
- access names and access IP addresses of client systems accessing a site,
- referer lists indicating where users are accessing a server,
- most common visitor domains,
- most common external references,
- first time visitors,
- returning visitors,
- most frequent visitors,
- visitors per visitor category,
- visits per visitor category,
- client demographics including geography, age, income, profession,
- where do people come from when accessing an area, and
- where clients go from the area accessed.

12. The method according to claim 9, wherein the application activity comprises the following data:
- hits to a site,
- new contents for the site,
- number of files sent,
- hot hits including most frequently accessed files,
- most popular pages,
- types of transactions,
- date and time of transactions,
- time spent in a particular area,
- average time spent in the area,
- number of exits before a first page is transmitted,
- details of most popular objects,
- details of most popular pages,
- details of least popular objects,
- details of least popular pages,
- details of most popular entrance pages,
- details of most popular content categories,
- next click analysis,
- visits per content category, and
- visits to content combinations.

13. The method according to claim 1, wherein said method is implemented in a distributed on-line, and interactive environment including multiple client browsers, or networked clients.

14. The method according to claim 13, wherein the multiple client browsers of networked clients are capable of accessing a SmartEC™ server storing information.

15. The method according to claim 14, wherein the multiple client browsers or networked clients are capable of accessing a SmartEC™ server storing information including customer support material and sales campaign schedules.

16. The method according to claim 1, wherein said step (a) comprises the step of determining whether the data elements are located in open, closed, or registered environments.

17. The method according to claim 1, wherein said decision support user specified criteria comprise business operations management-related criteria for to monitoring and analyzing at least one of:
- business metrics including at least one of revenue, expenses, profitability, and subscriber based metrics,
- quality of service metrics,
- marketing initiative metrics, and
- competitive influence metrics.

18. The method according to claim 1, wherein said decision support user specified criteria comprise electronic-commerce management-related criteria for measuring success of at least one of:
- electronic-commerce applications to conduct commerce over the internet, and
- on-line content applications to add value to the service offering.

19. The method according to claim 1, wherein the data elements are determined dynamically in response to said decision support user specified criteria.

20. A computer system for supporting and analyzing electronic commerce data for electronic commerce service providers, comprising:
- at least one decision maker station connectable to
- at least one data collection and analysis system including
- at least one analysis module providing a mathematical engine to perform statistical and analytical analysis of the electronic commerce data in response to one or more business decision support requests sent from the decision maker station, said mathematical engine generating said analysis of the electronic commerce data being representative of business operational data integrated with web-specific data from multiple data sources to provide decision-support information in a business, rather than a technical, web site specific context;
- at least one electronic commerce data warehouse, responsively connected to said at least one analysis module and separated from external operational web-accessible systems including web servers and web-based databases, receiving and storing the electronic commerce data received from the external web-accessible systems for said analysis by said at least one analysis module, wherein the electronic commerce data is stored in said at least one electronic commerce data wave house being time-stamped, associated with a defined period of time, and subject-oriented including customer and product activities;
- at least one data mapping module, responsively connected to said at least one electronic commerce data warehouse, searching and transforming the electronic commerce data, and transmitting the electronic commerce data transformed to said at least one electronic commerce data warehouse.

21. The computer system according to claim 20, wherein the electronic commerce data received from the external web-accessible systems via said at least one data mapping module includes system logs including at least one of access logs, agent logs, and referer logs on the web servers, and user profiles including at least one of customers, and visitors.

22. The computer system according to claim 20, wherein change of the electronic commerce data stored in said at least one electronic commerce data warehouse is responsive to changes in said one or more business decision support requests, and update from one of the data sources.

23. The computer system according to claim 20, wherein said at least one electronic commerce data warehouse provides access to an administrator to determine and control said searching and information flow between the external operational web-accessible systems and said at least one electronic commerce data warehouse.

24. The computer system according to claim 23, wherein said at least one electronic commerce data warehouse provides the administrator the ability to initiate at least one of addition, and deletion of the electronic commerce data in said at least one electronic commerce data warehouse according to an appropriate time based on predetermined criteria.

25. The computer system according to claim 23, wherein said at least one electronic commerce data warehouse provides the administrator the ability to initiate a structural change of the electronic commerce data in said at least one electronic commerce data warehouse.

26. The computer system according to claim 20, wherein the electronic commerce data received from the external web-accessible systems via said at least one data mapping module includes an identity of a visitor visiting an area, what the visitor is looking at, and what resources the visitor is using.

27. The computer system according to claim 20, wherein the external data sources include external analysis applications responsive to the electronic commerce data.

28. The computer system according to claim 20, wherein the user profiles further include transient travelers.

29. The computer system according to claim 20, further comprising an electronic commerce service provider station connected to said at least one decision maker station and said at least one data collection and analysis system for transmitting said one or more business decision support requests and said analysis therebetween.

30. The computer system according to claim 29, wherein the electronic commerce service provider station is a web server.

* * * * *

UNITED STATES PATENT AND TRADEMARK OFFICE
CERTIFICATE OF CORRECTION

PATENT NO. : 6,934,687 B1  
DATED : August 23, 2005  
INVENTOR(S) : Betz, E. M. et al.

Page 1 of 1

It is certified that error appears in the above-identified patent and that said Letters Patent is hereby corrected as shown below:

Column 22,
Line 41, after "data" delete "wave" and insert -- ware --.

Signed and Sealed this

Thirtieth Day of May, 2006

JON W. DUDAS
*Director of the United States Patent and Trademark Office*